(12) United States Patent
Medioni et al.

(10) Patent No.: US 8,446,468 B1
(45) Date of Patent: May 21, 2013

(54) MOVING OBJECT DETECTION USING A MOBILE INFRARED CAMERA

(75) Inventors: Gerard Medioni, Los Angeles, CA (US); Cheng-Hua Pai, Los Angeles, CA (US); Yuping Lin, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 1341 days.

(21) Appl. No.: 12/142,442

(22) Filed: Jun. 19, 2008

Related U.S. Application Data

(60) Provisional application No. 60/944,979, filed on Jun. 19, 2007.

(51) Int. Cl.
*H04N 7/18* (2006.01)
(52) U.S. Cl.
USPC .......................................................... 348/144
(58) Field of Classification Search .................... 348/144
See application file for complete search history.

(56) References Cited

U.S. PATENT DOCUMENTS 7,605,369 B2 * 10/2009 Kerr .............................. 250/330
2007/0297696 A1 * 12/2007 Hamza et al. ................. 382/294

OTHER PUBLICATIONS

Pai, "Thesis : Moving Object Detection on a Runway Prior to Landing Using an Onboard Infrared Camera", May 2007, University of Southern California, p. 1-62.*
Censi, A.; Fusiello, A.; Roberto, V.; , "Image stabilization by features tracking," Image Analysis and Processing, 1999. Proceedings. International Conference on , vol., no., pp. 665-667, 1999.*
Cohen, I.; Medioni, G.; , "Detecting and tracking moving objects for video surveillance," Computer Vision and Pattern Recognition, 1999. IEEE Computer Society Conference on. , vol. 2, no., pp. 2 vol. (xxiii+637+663), 1999.*
Gandhi, T.L.; Devadiga, S.; Kasturi, R.; Camps, O.I.; , "Detection of obstacles on runway using ego-motion compensation and tracking of significant features," Applications of Computer Vision, 1996. WACV '96., Proceedings 3rd IEEE Workshop on , vol., no., pp. 168-173, Dec. 2-4, 1996.*
Bourquardez, O.; Chaumette, F.; , "Visual Servoing of an Airplane for Alignment with respect to a Runway," Robotics and Automation, 2007 IEEE International Conference on , vol., no., pp. 1330-1335, Apr. 10-14, 2007.*
Sull, S.; Sridhar, B.; , "Runway obstacle detection by controlled spatiotemporal image flow disparity," Computer Vision and Pattern Recognition, 1996. Proceedings CVPR '96, 1996 IEEE Computer Society Conference on , vol., no., pp. 385-390, Jun. 18-20, 1996.*

(Continued)

*Primary Examiner* — Lynn Feild
*Assistant Examiner* — Taylor Elfervig
(74) *Attorney, Agent, or Firm* — Fish & Richardson P.C.

(57) ABSTRACT

Systems and methods for moving object detection using a mobile infrared camera are described. The methods include receiving multiple frames, each frame including an image of at least a portion of a planar surface, stabilizing two consecutive frames of the plurality of frames, the stabilizing comprising determining a transformation mapping a succeeding frame of the two consecutive frames to a preceding frame of the two consecutive frames and based on the transformation, warping the two consecutive frames to a reference frame of the plurality of frames, and detecting a movement of an object in the two consecutive frames, the movement based on a change in positions of the object in the preceding frame and the successive frame.

33 Claims, 13 Drawing Sheets
(7 of 13 Drawing Sheet(s) Filed in Color)

OTHER PUBLICATIONS

Sull, S.; Sridhar, B.;, "Model-based obstacle detection from image sequences," Image Processing, 1995. Proceedings., International Conference on , vol. 2, no., pp. 647-650 vol. 2, Oct. 23-26, 1995.*

Hevenor, Richard A. and Pi-Fuay Chen. Automated Extraction of Airport Runway Patterns From Radar Imagery. Technical Report DTIC AD-A231 809, U.S. Army Corps of Engineers, Engineer Topographic Laboratories, Fort Belvoir, Virginia, Jun. 1990.*

Fischler, M., et al., "Random Sample Consensus: A Paradigm for Model Fitting with Applications to Image Analysis and Automated Cartography" *Communications of the ACM*, 24(6):381-395, Jun. 1981.

Gandhi, T.L., et al., "Detection of Obstacles on Runway using Ego-Motion Compensation and Tracking of Significant Features," *Proceedings 3rd IEEE Workshop on Applications of Computer Vision*, pp. 168-173, Dec. 1996.

Lowe, D.G., "Distinctive Image Features from Scale-Invariant Keypoints," *International Journal of Computer Vision*, 60(2):91-110, Oct. 2004.

Pai, C.-H., et al., "Moving Object Detection on a Runway Prior to Landing Using an Onboard Infrared Camera", *IEEE Conference on Computer Vision and Pattern Recognition*, pp. 1-8, Jun. 2007.

Sridhar, B., et al., "Passive range estimation for rotorcraft low-altitude flight," *Machine Vision and Applications*, 6(1):10-24, Dec. 1993.

Stauffer, C., et al., "Adaptive background mixture models for real-time tracking,", *Computer Society Conference on Computer Vision and Pattern Recognition (CVPR '99)*, 2:2246-2252, Jun. 1999.

Sull, S., et al., "Runway Obstacle Detection by Controlled Spatiotemporal Image Flow Disparity," *Conference on Computer Vision and Pattern Recognition (CVPR '96)*, pp. 385-390, Jun. 1996.

Yalcin, H., et al., "Background Estimation under Rapid Gain Change in Thermal Imagery," *IEEE Computer Society Conference on Computer Vision and Pattern Recognition—Workshops*, pp. 12-19, Jun. 2005.

Zheng, Q., et al., "Motion Detection in Image Sequences Acquired from a Moving Platform," *Proceedings of the International Conference on Acoustics, Speech, and Signal Processing*, 5:201-204, Apr. 1993.

* cited by examiner

MOVING OBJECT DETECTION USING A MOBILE INFRARED CAMERA

CROSS-REFERENCE TO RELATED APPLICATIONS

This application claims priority to U.S. Patent Application No. 60/944,979, entitled Moving Object Detection on a Runway in Infrared UAV Video System, to inventors Cheng-Hua Pai, Yuping Lin, and Gerard Medioni, which was filed on Jun. 19, 2007. The specification of the above application is incorporated herein by reference in its entirety.

BACKGROUND

The present specification relates to detecting moving objects, for example, detecting moving objects on a runway on which an airplane is to land.

To safely land any aircraft, whether manned or unmanned, the status of the runway needs to be monitored prior to landing, regardless of the lighting conditions. Previous methods for detecting motion on a moving camera include optical flow based approaches described in "Passive range estimation for rotor-craft low-altitude flight," (R. S. B. Sridhar and B. Hussien, Machine Vision and Applications, 6 (1): 10-24, 1993), "Detection of obstacles on runway using ego-motion compensation and tracking of significant features," (T. G. R. Kasturi, O. Camps, and S. Devadiga, Proceedings $3^{rd}$ IEEE Workshop on Applications of Computer Vision, 1996 (WACV '96), pages 168-173, 1996), and "Runway obstacle detection by controlled spatiotemporal image flow disparity," (S. Sull and B. Sridhar, IEEE Transactions on Robotics and Automation, 15(3): 537-547, 1999). Other methods include background subtraction based approaches described in "Motion detection in image sequences acquired from a moving platform," (Q. Zheng and R. Chellappa, Proc. Int. Conf. Acoustics, Speech, and Signal Processing, Minneapolis, 5:201-205, 1993).

Optical flow approaches require the availability of camera motion parameters (position and velocity) to estimate object range. In certain previous techniques, the optical flow is first calculated for extracted features. A Kalman filter uses the optical flow to calculate the range of those features. The range map is used to detect obstacles. In other techniques, the model flow field and residual flow field are first initialized with the camera motion parameters. Obstacles are then detected by comparing the expected residual flow with the observed residual flow field. Instead of calculating optical flow for the whole image, these techniques only calculate optical flow for extracted features since full optical flow is unnecessary and unreliable.

In contrast to the optical flow approaches, background subtraction approaches do not need camera motion parameters. Camera motion is compensated by estimating the transformation between two images using matched feature points. Moving objects are detected by finding the frame differences between the motion-compensated image pairs. Optical flow methods may not be able to detect moving objects if the scale of the moving objects are small.

SUMMARY

This specification describes technologies relating to moving object detection using a mobile infrared camera. In one example, as an airplane approaches a runway, moving objects on the runway are detected using an infrared camera onboard the airplane. The runway is a planar surface. The infrared camera captures a sequence of frames that are images of at least portions of this planar surface. The sequence is stabilized with respect to automatically selected reference frames. The reference frames are selected using feature points in the neighborhood of the runway. The stabilized sequence is normalized to compensate for global intensity variation caused by the gain control of the infrared camera. A background model is created to learn an appearance model of the runway. Moving objects are identified by comparing each image in the sequence with the background model.

In one aspect, a computer-implemented method includes receiving multiple frames representing images including at least portions of a planar surface, each image captured at a separate location, for any two consecutive frames in the plurality of frames, determining a transformation mapping a portion of the planar surface included in a first frame of the two consecutive frames to a corresponding portion of the planar surface included in a second frame of the two consecutive frames, selecting a reference frame of a plurality of reference frames from the plurality of frames, transforming the plurality of frames to the selected reference frame based on the determined transformation to stabilize the plurality of frames, and providing the stabilized frames as an output.

This, and other aspects, can include one or more of the following features. The method can further include periodically updating the reference frame to a new reference frame included in the plurality of reference frames. The new reference frame can be selected based on a ratio of an edge length of a portion of the planar surface in the reference frame and a corresponding edge length in the new reference frame. Determining the transformation can include identifying feature points in the two consecutive frames. The features points can be determined using Scale Invariant Feature Transform. The planar surface can be a polygon. The polygon can consist of four sides. The plurality of frames can be captured by an infrared camera. The infrared camera can be mounted on an airplane. The planar surface can be a runway on which the airplane is to land. The method can further include performing motion detection using background modeling on the stabilized frames, wherein the background modeling identifies an image in the reference frame, identifying an image in a stabilized frame that corresponds to the image in the reference frame by comparing images in the stabilized frame with images in the reference frame, and upon identifying that a position of the corresponding image in the stabilized frame is different from the image in the reference frame, determining that the corresponding image represents a moving object.

In another aspect, a computer-implemented method is described. The method includes receiving multiple frames, each frame including an image of at least a portion of a planar surface, stabilizing two consecutive frames of the multiple frames, the stabilizing including determining a transformation mapping a succeeding frame of the two consecutive frames to a preceding frame of the two consecutive frames and based on the transformation, warping the two consecutive frames to a reference frame of the plurality of frames, and detecting a movement of an object in the two consecutive frames, the movement based on a change in positions of the object in the preceding frame and the successive frame.

This, and other aspects, can include one or more of the following features. The method can further include capturing the multiple frames using an infrared camera. The method can further include identifying the planar surface in at least one frame of the multiple frames. The stabilizing can further include determining a transformation mapping a frame in the multiple frames to the reference frame. The detecting can further include filtering the multiple frames to retain only the at least a portion of the planar surface. The detecting can further include determining a transformation compensate for a variation in intensity gain between the two consecutive frames. The movement of the object in the two consecutive frames can be detected using background modeling.

In another aspect, a computer-implemented method includes receiving an image sequence including multiple images of an airplane runway, each image captured from a different location, for any two consecutive images of the multiple images, determining a transformation mapping points on the airplane runway included in a first image of the two consecutive images to corresponding points in a second image of the two consecutive images, stabilizing the multiple images using reference images, a reference image selected from the multiple images, the reference image serving as a reference against which images positioned after the reference image in the image sequence are compared, the transformation stabilizing the multiple images, and identifying moving objects on the airplane runway upon determining that a position of an object in a given image is different from a position of the corresponding object in an image that serves as a reference image to the given image.

This, and other aspects, can include one or more of the following features. The multiple images can be captured by and received from an infrared camera mounted on an airplane approaching the runway. Determining the transformation can further include identifying edges of the airplane runway, the edges defining a four-sided polygon, and using Scale Invariant Feature Transform. The selected reference image can be updated periodically, the updating including replacing the selected reference image with a new reference image positioned subsequent to the selected reference image in the image sequence. The method can further include using background modeling to identify the moving objects in the airplane runway. The method can further include filtering the multiple images after stabilizing such that the multiple images include only the airplane runway.

Other aspects include systems that include means for performing the functions described previously, and computer-readable media embodying computer program products that include instructions to cause data processing apparatus, processors, and the like, to perform the functions described previously.

Particular implementations of the subject matter described in this specification may provide one or more of the following advantages. Distant moving objects on a runway can be detected in both synthetic and real world data. Such detection can be useful for both unmanned air vehicles (UAVs) as well as pilots, particularly at night, to determine whether it is safe to land. The detection can give enough time for both UAVs and pilots to respond to the presence of moving objects on the runway. Robustness can be provided to both the plane motion and to illumination, so as to provide around-the-clock functionality.

The details of one or more implementations of the specification are set forth in the accompanying drawings and the description below. Other features, aspects, and advantages of the specification will become apparent from the description, the drawings, and the claims.

BRIEF DESCRIPTION OF THE DRAWINGS

The file of this patent contains at least one drawing executed in color. Copies of this patent with color drawings will be provided by the Patent and Trademark Office upon request and payment of the necessary fee.

Like reference numbers and designations in the various drawings indicate like elements.

DETAILED DESCRIPTION

This specification describes systems and techniques for detecting moving objects on a planar surface, for example, a runway on which an airplane is to land, using a frame capturing device, for example, an infrared camera capable of capturing video, which is mounted onboard the airplane. Instead of stabilizing consecutive frames captured by the infrared camera and comparing the consecutive frames to find the changing parts in the sequence, multiple frames are stabilized with respect to a local reference frame and a background model is used to detect changes caused by moving objects.

Background modeling is a method for detecting moving objects in sequences captured by static cameras. Details regarding background modeling are described in "Adaptive background mixture models for real-time tracking," (W. G. Chris Stauffer, 1999 IEEE Computer Society Conference on Computer Vision and Pattern Recognition (CVPR '99), 2:2246, 1999). In some implementations, the process of using background modeling to detect moving objects can be divided into two parts: stabilization and motion detection. Stabilization compensates for the camera movement by stabilizing the planar surface, for example, the runway. Once the stabilized runway is obtained, a background model is used to segment moving blobs on the runway.

Figure 1:
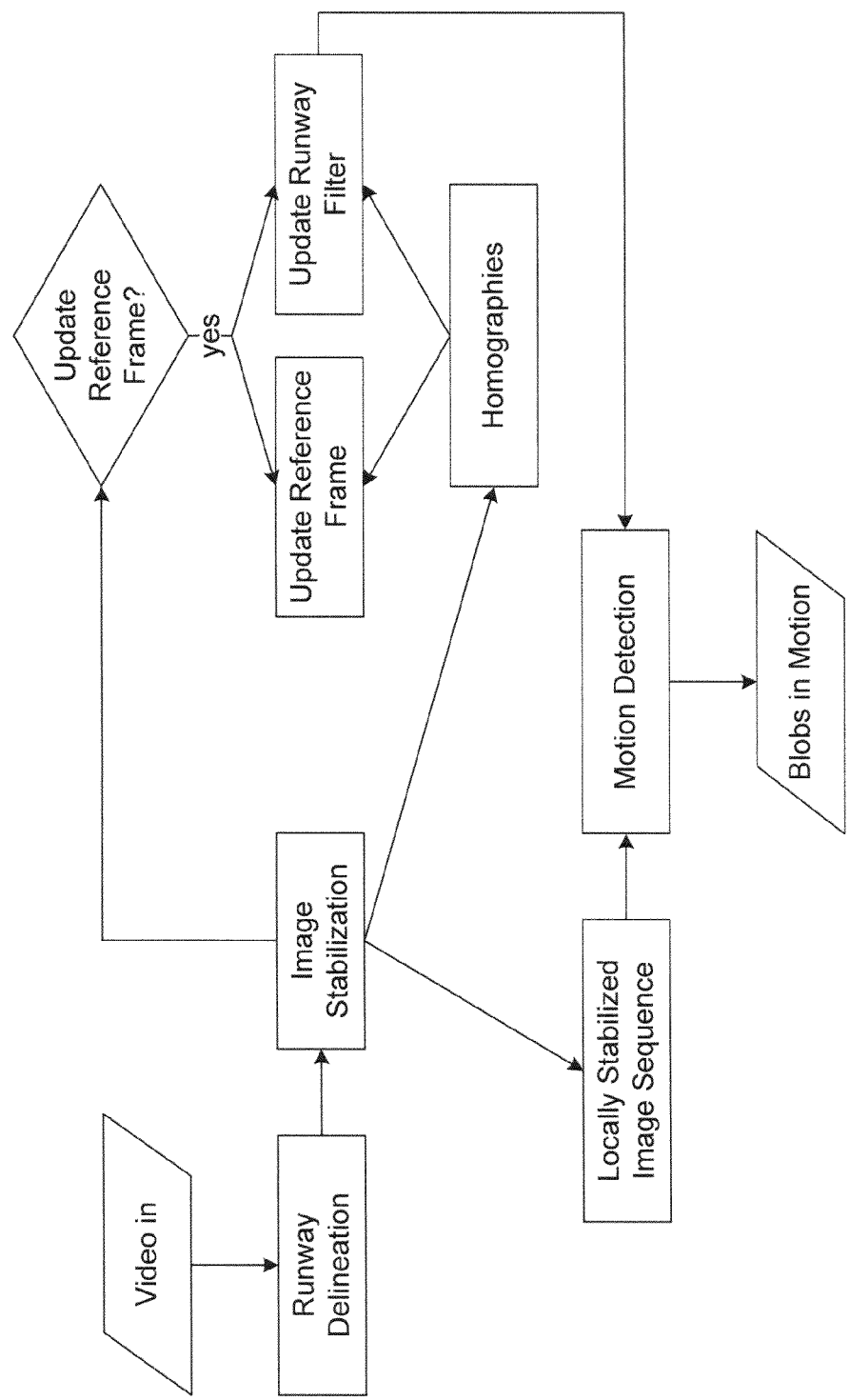
FIG. 1 is schematic of an example method to detect moving objects.

FIG. 1 is schematic of an example method to detect moving objects. As shown in FIG. 1, in some implementations, a "runway delineation" process identifies a planar surface, for example, a four sided polygon, which includes the runway location in the first image. Once this four sided polygon region is selected, an "image stabilization process" estimates the homographies between the selected region in each pair of consecutive images. Then, images are warped to automatically selected reference frames to form a locally stabilized image sequence. The reference frame is updated when necessary by the "update reference frame" process. The homographies along with the locally stabilized image sequence are then passed to the "motion detection" process where global intensity variation is compensated and moving objects in the image are identified.

In some implementations, the frame capturing device, for example, the infrared camera, is mounted on an airplane. The infrared camera is a video camera that is configured to be turned on as the airplane approaches the runway. The video camera captures a video segment including multiple frames where each frame includes at least a portion of the planar runway surface. Because the moving images captured by the infrared camera can make moving object detection difficult, the image sequence needs to be stabilized. By treating the runway as a planar surface, changes of viewpoint between two adjacent frames of the multiple frames captured by the infrared camera, can be represented by a homography. The homography is a transformation mapping a portion of the planar surface included in a first frame of two consecutive frames to a corresponding portion of the planar surface included in a second frame of two consecutive frames. For example, the homography is a transformation, mapping a point on a ground plane as seen from one camera to the same point on the ground plane as seen from a second camera. In the present example, although both frames are captured using the same camera, the camera is mobile.

In some implementations, a planar surface is used for the stabilization process because non-planar areas may not fit the transformation. In order to restrict the region of interest in a frame to a planar surface, the planar region around the runway is selected, and the stabilization process is applied only to this region. In some implementations, the selected planar region is a polygon, for example, a four sided polygon, the vertices of which can be hand-picked. In alternative implementations, Global Positioning Systems (GPS) mounted on the airplane can be configured to automatically determine the locations of the vertices. In some implementations, vanishing line methods can be employed to stabilize the image below the vanishing line. However, because the bottom of the image is closer to the airplane, the height of the buildings and trees may render the stabilization process unstable.

Let $I_i$ be the $i^{th}$ frame in the video sequence starting at 0, $R_i$ be the four sided polygon which represents the planar region in $I_i$ containing the runway and marked by its vertices, and $H_{i,i-1}$ be the homography between $R_i$ and $R_{i-1}$. Thus, $$R_{i-1} = H_{i,i-1} R_i$$

and $$R_i = H_{i-1,i} R_{i-1}$$

A reference frame can be any frame in the image sequence, and can be denoted by the index Ref, to which the current frame registers. The reference frame is initialized to 0, meaning that the first frame in the sequence is initialized to be a reference frame. Subsequently, the reference frame is automatically updated, periodically, and is represented as shown in (1):

$$R_{Ref} = \begin{cases} R_n, & \text{if } n = \text{Ref} \\ H_{m,Ref} R_m & \text{if } m > \text{Ref} \end{cases} \quad (1)$$

The homography mapping region $R_m$ to the local reference frame $R_{Ref}$ is derived as shown in (2):

$$H_{m,Ref} = \prod_{i=Ref+1}^{m} H_{i,i-1} \quad (2)$$

To estimate the homographies, the features between consecutive frames are matched and then Random Sample Consensus (RANSAC) robust estimation is performed. RANSAC is an iterative method to estimate parameters of a mathematical model from a set of observed data which contains outliers. The quality of the extracted features greatly affects the quality of stabilization. In some implementations, Scale Invariant Feature Transform (SIFT) can be used to estimate the homographies. Details regarding SIFT can be found in "Distinctive image features from scale-variant keypoints," (D. G. Lowe, International Journal of Computer Vision, 60(2): 91-110, 2004). In alternative implementations, Harris corners can be used to estimate the homographies. However, SIFT can be more stable than the Harris corners technique. Also, SIFT can yield more features, for example, around 800 features in a 720×480 frame. Also, SIFT can produce a number of reliable matches, which, in turn, can produce accurate transformation estimation.

Figure 2:
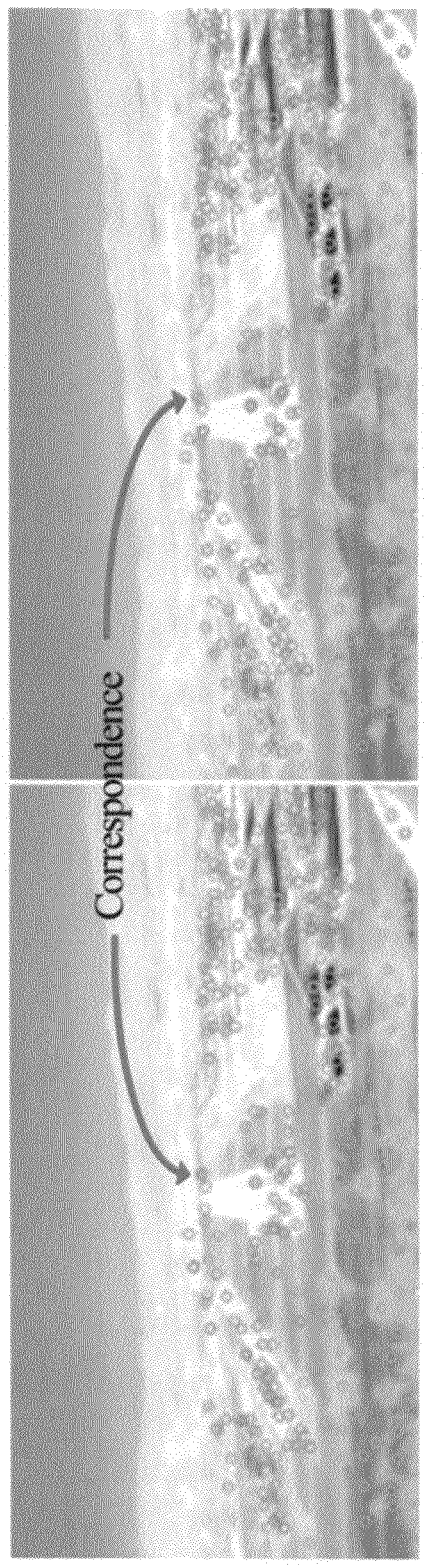
FIG. 2 is a schematic of example consecutive images from which features are extracted and matched.

FIG. 2 is a schematic of example consecutive images from which features are extracted and matched. SIFT feature points within the runway in each pair of consecutive images are extracted and matched using a nearest neighbor matching method that is described in "Distinctive image features from scale-variant keypoints," cited previously. A RANSAC process, as described in "Random sample consensus: A paradigm for model fitting with applications to image analysis and automated cartography" (M. Fischler and R. Bolles, Communications of the ACM, 24(6): 381-395, 1981), can be applied to estimate the best perspective transformation for the pair of images from the matched feature points. The RANSAC process chooses four random correspondences from the matched feature pairs, and calculates a perspective transformation based on the chosen points. The transformation that produces the largest number of inliers is chosen as the best approximation.

Figure 3:
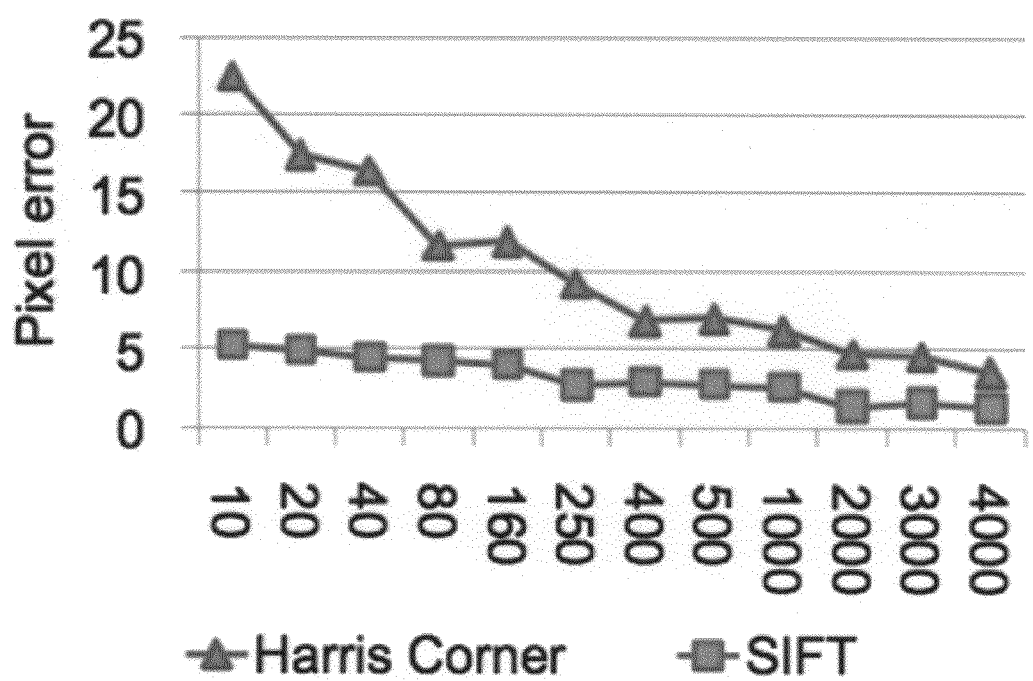
FIG. 3 is the registration error of SIFT and Harris Corner with respect to the numbers of iterations.

FIG. 3 is the registration error of SIFT and Harris Corner with respect to the numbers of iterations. In some implementations, to determine the appropriate number of RANSAC iterations to use, 500 frames from a sequence are taken and control points in the first and last frame, respectively, are selected. The sequence with several different numbers of iterations of RANSAC are registered, and the displacement of the estimated control points to the ground truth in the last frame is measured. The average displacements of the control points with respect to different numbers of iterations are shown in FIG. 3. As shown in FIG. 3, RANSAC with 2000 iterations provides both registration performance and stability for motion detection.

Further, FIG. 3 shows the performance of Harris corners that was evaluated on the same sequence. An average of 800 Harris corners were generated for each frame. Then, Harris corner features were matched by computing the maximum normalized cross correlation of the corresponding 13×13 patches centered on the features. As shown in FIG. 3, SIFT features produced lower error than Harris Corners regardless of whether a number of iterations were small or large.

In some implementations, a single reference frame can be chosen for the entire sequence. However, in a long sequence, small errors are inevitable during registration, and these small errors may accumulate to affect the stabilization results of later frames. Moreover, the distance to the runway varies significantly in a sequence, and some detail in the later frames may be lost if every frame captured by the infrared camera is warped to a fixed reference frame.

In some implementations, a first reference frame can be chosen and updated during the stabilization process. In some implementations, the reference frame can be updated at fixed intervals in time. In such scenarios, for every instance that the reference frame is updated, a number of frames between a current reference frame and an updated reference frame is fixed. However, such fixed time intervals may be too short when the airplane is very far from the runway, because the scale of the runway does not significantly change during the fixed time interval. Further, the time interval may be too long when the airplane is close to the runway because the aspect of the runway changes quickly.

Figure 4:
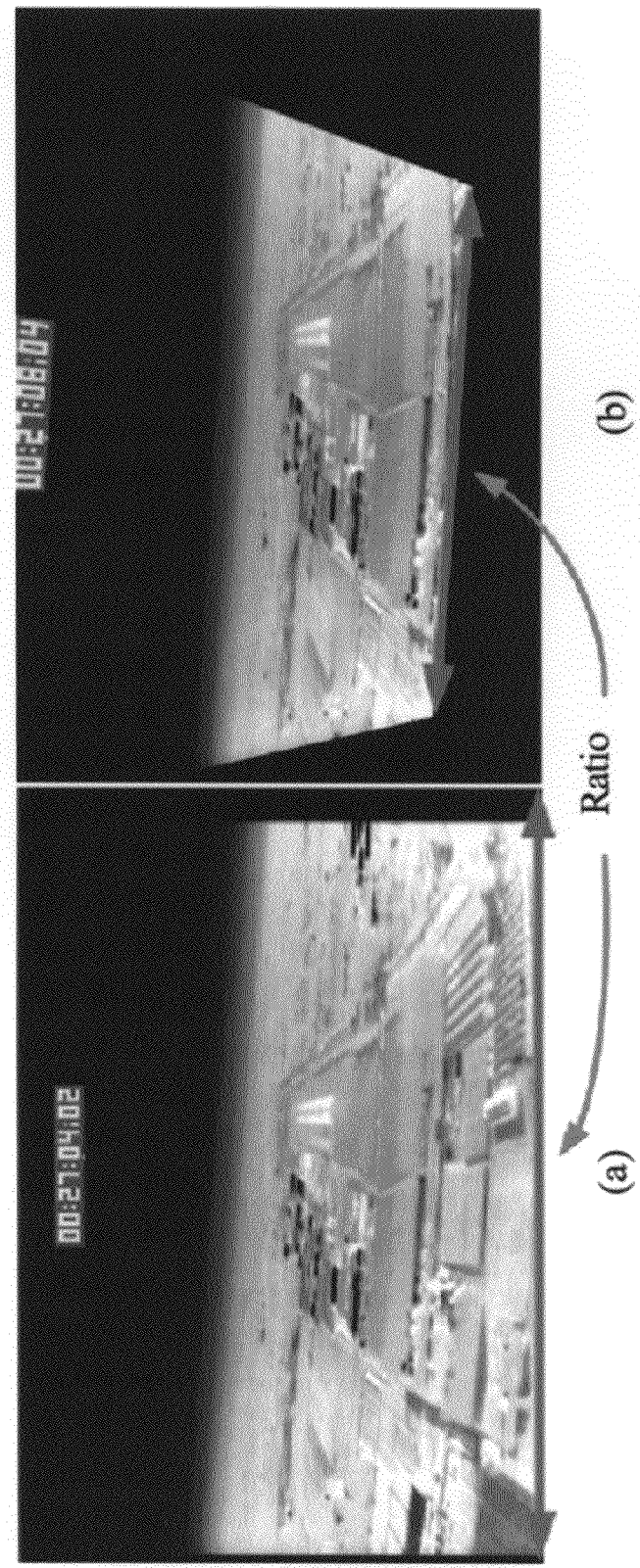
FIG. 4 is a schematic showing edge lengths of a reference frame and a stabilized frame.

FIG. 4 is a schematic showing edge lengths of a reference frame and a stabilized frame. In some implementations, a measure is chosen for updating the reference frame such that a longer time interval is provided when the runway is far, and a shorter time interval is provided when the runway is near. As the airplane moves forward, the lower part of the scene in the previous frame moves out of the image. Therefore, when the image is registered to a reference frame, the registered image tilts toward the airplane, and the lower edge in the reference frame becomes shorter. As shown in FIG. 4, the ratio of the lower edge length before and after the warping is used as the basis to decide whether to update a reference frame. The length of the lower edge in a frame before and after tilt is termed length before and length after, respectively. In some implementations, the threshold ratio defined as (length after)/(length before)=0.8. Since this ratio is related to the tilt angle, establishing a threshold on this measure has the same effect as establishing a threshold on the tilt angle.

Figure 5:
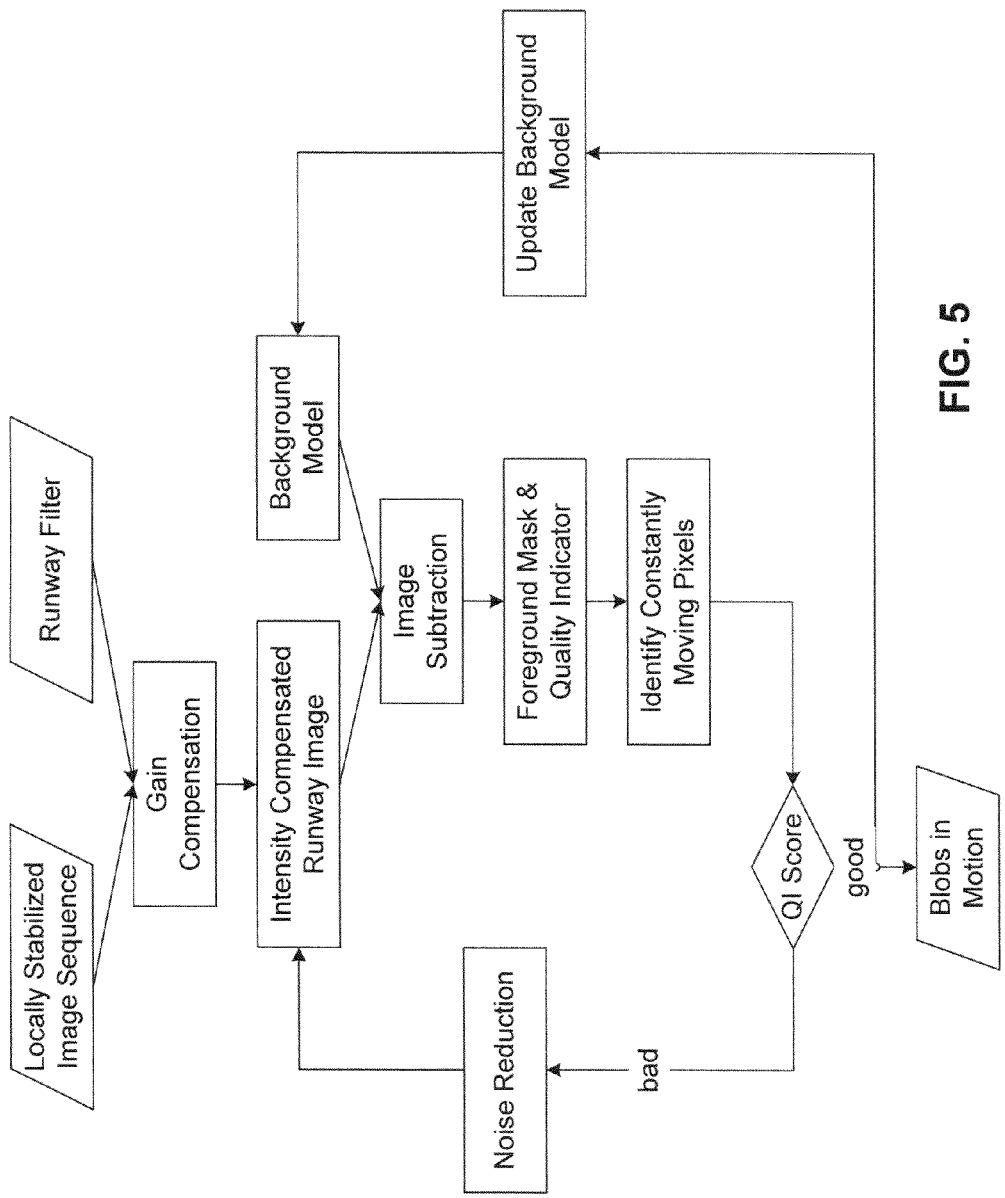
FIG. 5 is an example of a process of motion detection.

FIG. 5 is an example of a process of motion detection. Having stabilized the image sequence, the next step includes detecting moving objects in the sequence. To do so, background modeling, described in "Adaptive background mixture models for real-time tracking," cited previously, is used. Because the area of interest is the runway, other areas in a frame can be filtered out. A runway filter f is defined to be a binary mask in the shape of the runway. The vertices of the runway in the mask are selected for the test sequences. In some implementations, the process of filtering out regions that are not the runway includes applying an "and" operation on the image and the binary mask to single out the area of interest. Alternatively, or in addition, other filtering operations can be used to accomplish similar results. When the reference frame changes from $I_i$ to $I_j$, the following equation is applied to the runway mask vertices to update the locations of the vertices in the new reference frame:

$$f_i = H_{j,i} f_j$$

To use background modeling, the intensity across the whole image sequence must be kept constant. To do so, the automatic gain control of the infrared camera can require gain compensation. Gain compensation is described in "Background estimation using rapid gain change in thermal imagery," (R. C. H. Yalcin and M. Herbert, Second IEEE Workshop on Object Tracking and Classification in and Beyond the Visible Spectrum (OTCBVS'05), 2005). As described, the intensity between any two images with different gains can be modeled by an affine transformation where $m_{i,j}$ is a scalar, $b_{i,j}$ is a constant and $\epsilon_{i,j}$ is the error between frame. See, (3).

$$\forall (x,y): I_j(x,y) = m_{i,j} I_i(x,y) + b_{i,j} + \epsilon_{i,j} \qquad (3)$$

Figure 6:
FIGS. 6A and 6B are images of a runway before and after gain compensation, respectively.

FIGS. 6A and 6B are images of a runway before and after gain compensation, respectively. In some implementations, the affine transformation can be estimated by Least Mean Square Estimation (LMSE). In this manner, the gain can be compensated by ignoring the saturated pixels. Because LMSE is used, small errors can be introduced in the compensation. If the entire sequence is compensated recursively, the errors accumulate and affect the global intensity of later frames. To increase the accuracy of the gain compensation, in some implementations, the image intensity is corrected with respect to the reference frame of the current frame rather than the corrected previous frame. As a result, errors no longer accumulate and the intensity of the sequence is stabilized locally. Because different reference frames also have different global intensity, the intensity of all reference frames is adjusted to a specific intensity before compensating other frames against the adjusted reference frames. In this manner, the consistency of global intensity is maintained.

Even if the learning rate of the background model is increased to better reflect the intensity change, very dark or very bright images are obtained at the end of some sequences. This is because, normalizing the reference frame against the background model while normalizing the rest of the frames against the reference frame forces every frame to behave like the initial background. As a result, the intensity range of the initial background greatly affects the compensation quality. Also, linearly scaling the initial background to increase the intensity range produces similar results. To account for this, the intensities of the new reference frames are used as references. The mean intensity of the background model, denoted as $\mu_{Ref}$, is adjusted against the new reference frame, $I_{Ref}$, using techniques similar to the gain compensation technique. See, (4).

$$\mu_{Ref}(x,y) = m_{Ref}(x,y) I_{Ref}(x,y) + b_{Ref} + \epsilon_{Ref} \qquad (4)$$

By doing so, not only is the effect of the initial background reduced, but also the quality of the background model is increased.

A Gaussian distribution is used to model the intensity of each pixel, as described in "Adaptive background mixture models for real-time tracking," cited previously. The mean, $\mu$, of the Gaussian model is initialized to the value in the first image. The variance, $\sigma^2$, is initialized to a constant value, for example, 5. Both mean and variance are updated for each new frame according to the formula shown in (5), where $\rho$ is the learning rate, for example, 0.02.

$$\mu_i(x,y) = (1-\rho)\mu_{i-1}(x,y) + \rho I_i(x,y) \qquad (5)$$

$$\sigma_i^2(x,y) = (1-\rho)\sigma_{i-1}^2(x,y) + \rho(I_i(x,y) - \mu_i(x,y)) \qquad (6)$$

As in standard background modeling, the pixels are compared to background pixels to reduce noise caused by stabilization error. In addition, the pixels are also compared with the corresponding neighbors, for example, eight neighbors, in the background model. The minimum difference is compared with the variance. Pixels having intensity difference greater than a threshold, for example, $4\sigma_i^2$, are marked as foreground pixels.

When the reference frame is updated, the background model is also updated according to (7), (8), and (9).

$$[u,v,1]^\dagger = H_{j,i}(x,y,1)^\dagger \qquad (7)$$

$$\mu_i(u,v) = \mu_j(x,y) \qquad (8)$$

$$\sigma_i^2(u,v) = \sigma_j^2(u,v) \qquad (9)$$

In (7), (8), and (9), x and y are coordinates in the old reference frame, and u and v are the coordinates in the new reference frame. Each reference frame update provides additional details that can be classified as foreground because such details were not present in the background model. To reduce the effects of details, the background model is updated with the new reference frame by applying (5) and (6) after warping.

Because the scale of the moving objects is small, morphological operations cannot be applied to each foreground mask to reduce noise. Doing so may remove the targets, namely, the moving objects. Instead, a small moving object can be differentiated from random noise using smoothness constants. After the binary foreground mask is produced, it is compared with the previous foreground mask to find constant moving pixels. In order to suppress the most amount of noise without removing the object, constant moving pixels are defined as pixels that are marked as foreground in both the previous and the current foreground mask or the foreground pixels that have moved one pixel in any direction. This can be done efficiently by first dilating the previous foreground mask and then applying a binary "and" operation on the dilated previous mask and the current mask.

To evaluate the quality of a resulting foreground mask, a quality indicator is used. In some implementations, the indicator is the total number of foreground pixels in the foreground mask. The result is considered poor if the number is greater than a threshold, for example, 250. Another option would be to select the ratio of number of foreground pixels to runway size as the threshold.

In some implementations, the correspondences, that are distances of the pixels from each other, are used for the homography estimation in each iteration of RANSAC. This improves the stabilization quality. Further, this modification ensures that the stabilization error is distributed through the whole image, thus improving the overall stabilization accuracy. In some implementations, the correspondences are divided into four quadrants, and a correspondence from each quadrant is randomly selected in each iteration. This approach ensures the distance between correspondences while the grouping of correspondences can be done in advance at a marginal cost. Even though the random noise is removed when pixels are checked for constant movement, there is still some noise caused by local intensity variation. For example, sunlight penetrating through clouds can create a bright area in the image.

Figure 7C:
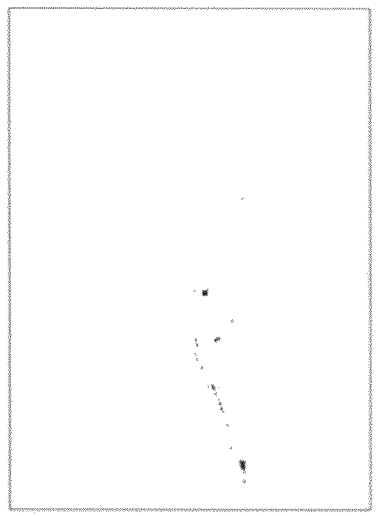
FIGS. 7A-7C are foreground pixels' intensities in runway image vs. the same pixels' intensities in the background model.
Figure 7B:
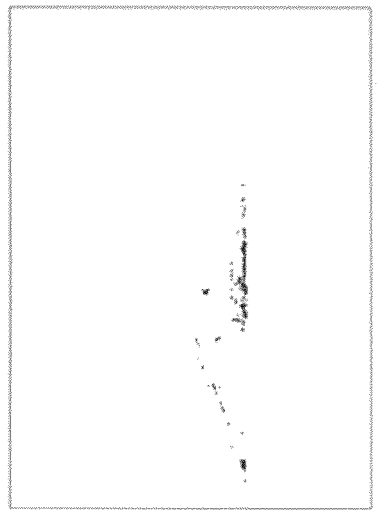
Figure 7A:
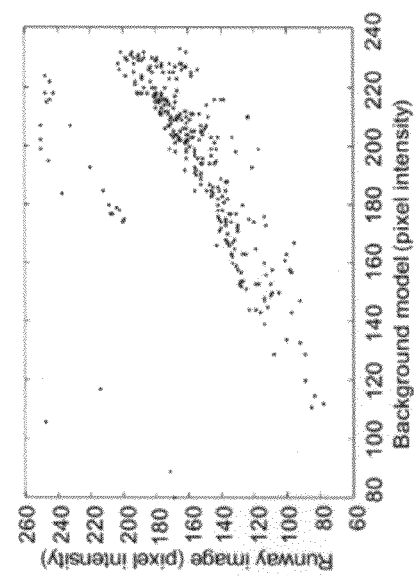

FIGS. 7A-7C are foreground pixels' intensities in runway image vs. the same pixels' intensities in the background model. FIG. 7B is a plot of the foreground mask before noise reduction. FIG. 7C is a plot of foreground mask after noise reduction. By comparing the foreground pixel intensities in the registered runway image and the corresponding pixel intensities in the mean of the background model, a linear relationship was found. This finding considerably reduced noise.

Figures 8A, 8B:
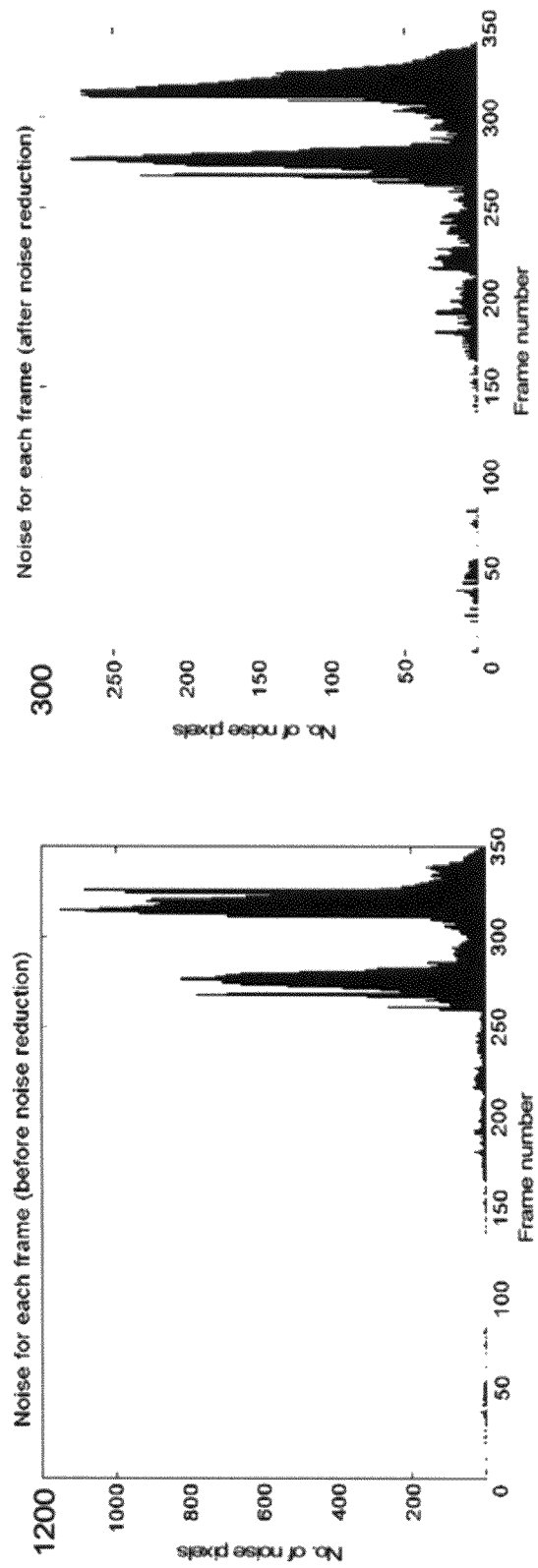
FIGS. 8A and 8B are plots of noise for each frame before and after noise reduction.

FIGS. 8A and 8B are plots of noise for each frame before and after noise reduction. By applying a normalization process similar to gain compensation on the foreground pixels, namely, using (10), additional reduction of noise by 75% was observed.

$$I_i^{fg}(x,y) = m_i \mu_i^{fg}(x,y) + b_i + \epsilon_i \quad (10)$$

As shown in FIGS. 8A and 8B, the scales in the vertical axes are different. $I_i^{fg}$ denotes the intensities of the foreground pixels at index I, and $\mu_i^{fg}$ is the pixel intensities in the background model. FIG. 8A is a plot of noise for each frame before noise reduction and FIG. 8B is a plot of noise for each frame after noise reduction.

The system was tested with both synthesized and real moving objects in real word runway sequences. For the synthetic experiments, 150 runway sequences were produced from a real sequence. The synthetic sequences have 351 frames and for each sequence, a different simulated object is added. The added objects are of different sizes, moving in different directions at different speeds. For the real world test, the program was run on 18 real world runway sequences with moving objects. The performance of the system is about 5 seconds per 720×480 frame on a 2.8 GHz Pentium 4 processor. The stabilization process is the most computationally complex part of the system, due to the extraction and matching of SIFT features. The motion detection process can generate foreground masks at about 10 frames per second.

Figure 9:
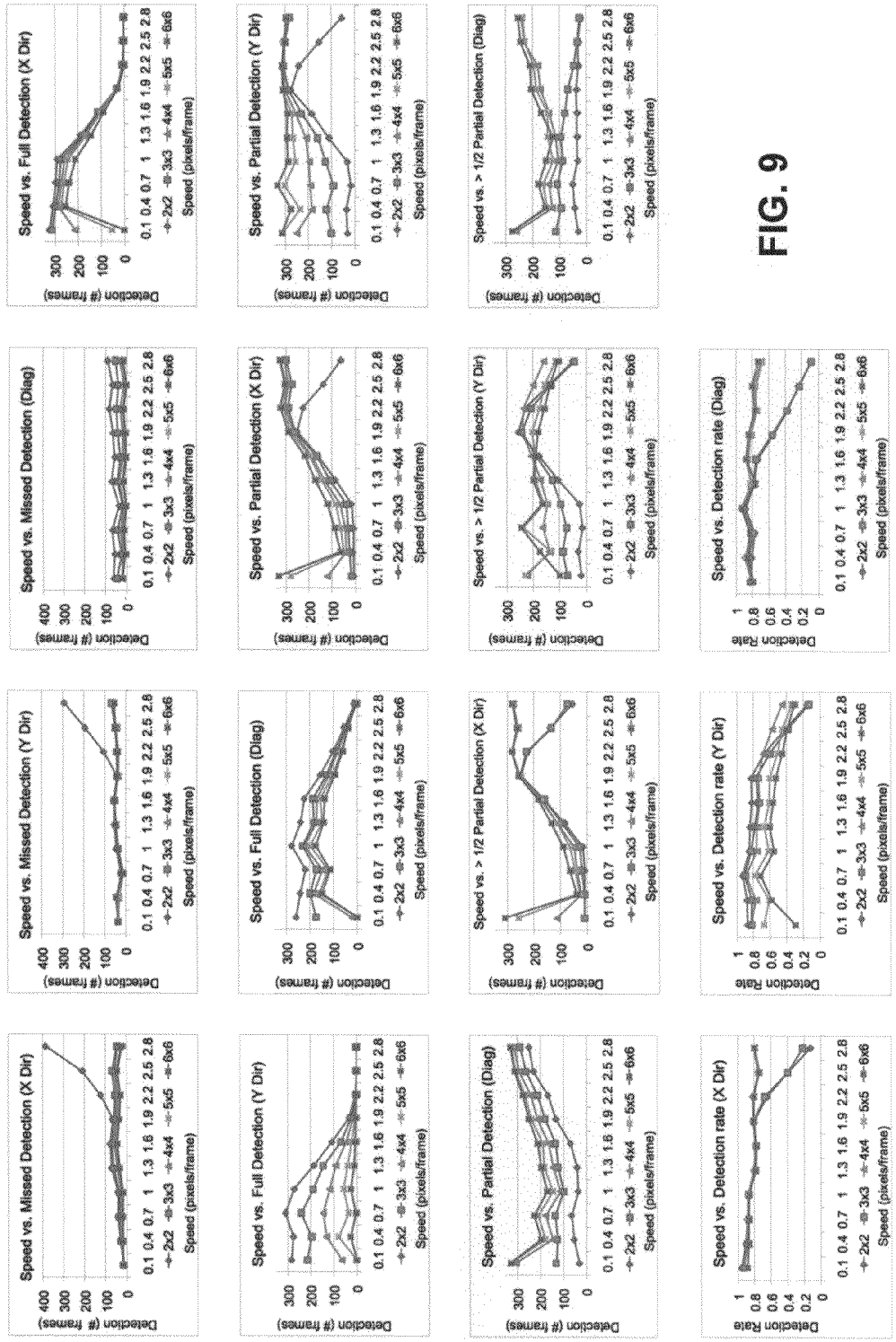
FIG. 9 includes multiple plots displaying results for synthetic data.

FIG. 9 includes multiple plots displaying results for synthetic data. The three variables for the simulated objects are size, direction, and speed. For the size variable, the pixel sizes are varied from 2×2 to 6×6. For the direction variable, diagonal, vertical, and horizontal directions are considered. For the speed variable, the range is from 0.1 pixels per frame to 2.8 pixels per frame with a 0.3 pixels per frame increment. By mixing and matching the three variables, 150 test sequences were generated. Since the objects positions in the simulated sequences are known, statistical data can be collected for the analysis. Different types of frames are identified and counted. The frames include frames in which the object is completely missed, detected fully, detected partially, as well as frames in which more than half of the object is detected partially. In FIG. 9, plots (a), (b), and (c) are plots of speed vs. number of missed detection in three directions, plots (d), (e), and (f) are plots of speed vs. number of full detection in three directions, plots (g), (h), and (i) are plots of speed vs. number of partial directions, and plots (j), (k), and (l) are plots of speed vs. number of detecting more than half of the objects. The detection rate for objects moving in three directions are shown in plots (m), (n), and (o).

It can be concluded from the data shown in FIG. 9 that the detection rate stays about the same across different noise levels. Also, a small increase of noise with increasing size of the objects was found. One reason for this behavior is the use of a dilation with a 3×3 kernel and an "and" operation on adjacent frames to find the constant foreground pixels. Larger objects will allow more noise around the object to pass through this filter.

The detection rate is greater than 73% in diagonal direction and greater than 77% in horizontal and vertical directions except for objects of size 2×2 moving at a speed higher than 1.9 pixels per frame. The detection rate of detecting more than half of the object is greater than 69% in diagonal direction except objects of size 2×2 and 3×3 moving faster than 1.6 pixels per frame. IN the horizontal direction, the detection rate is greater than 73% except for objects of size 2×2 and 3×3 moving at more than 1.9 pixels per frame. In the vertical direction, the detection rate is greater than 60%, except for objects of size 6×6 and objects of all sizes with speed greater than 1.9 pixels per frame.

Figure 10:
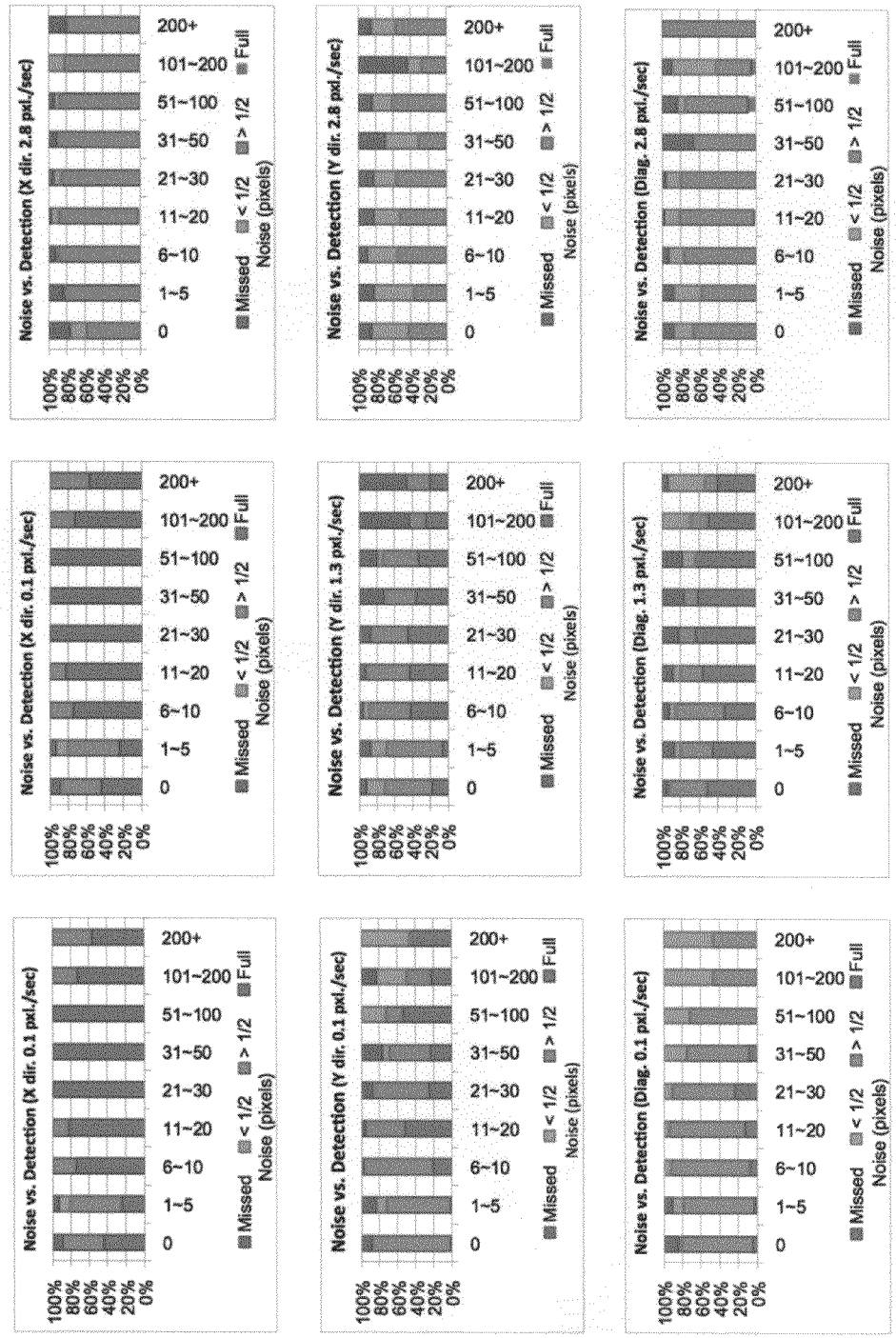
FIG. 10 includes plots of noise vs. detection of a 4×4 object in multiple directions.
Figure 11A:
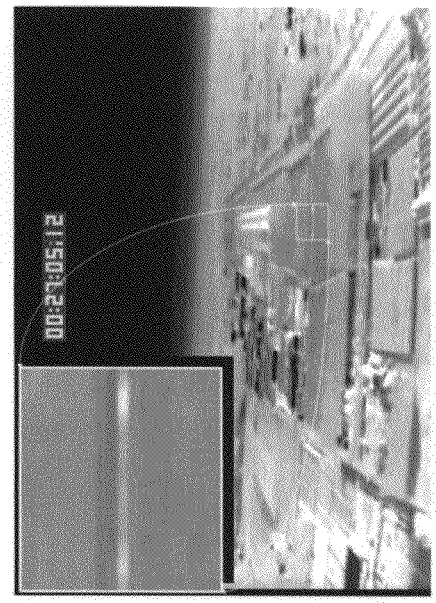
FIGS. 11A-11C depicts a real world runway image before and after stabilization, and the extracted moving objects.
Figure 11B:
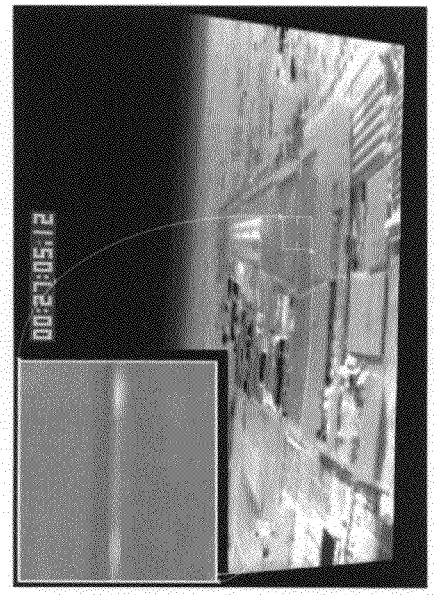
Figure 11C:
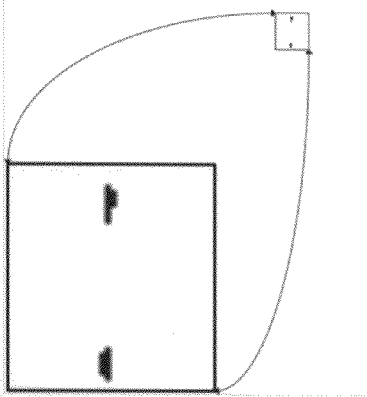

FIG. 10 includes plots of noise vs. detection of a 4×4 object in multiple directions. To study the behavior under different noise levels, a noise vs. detection table was collected. In FIG. 10, "full" indicates that the target is fully detected, ">½" and "<½" each indicate detecting more than and less than half the target, respectively. "Miss" indicates that the target is completely missed. The system was tested on 18 sequences of the same runway taken in 4 different days at different times. Since no moving objects were observed in the runway, the road just before the runway was included for the test. This is illustrated in FIGS. 11A-11C which depicts a real world runway image before and after stabilization, and the extracted moving objects. FIG. 11A is an image of a real world runway before stabilization. FIG. 11B is an image of the real world runway after stabilization. FIG. 11C is an image of the extracted moving objects. The system successfully detects 35 out of 37 vehicles moving on the road. One of the cars was not detected because the background model adapted to a slow moving truck before the car. The other car that was not detected was removed during noise reduction because it signals representing the car appeared near the end of the sequence where noise is high.

Based on the experiments with the synthetic and real data, it was found that when the contrast in a sequence is low, fewer features can be extracted for the stabilization. As a result, the stabilized runway slowly slides. Further, this allows the background model to adapt to the changes. In the simulated test, a small increase of noise was noticed with an increase in the size of the object. One reason for this behavior is the use of a dilation with a 3×3 kernel and an "and" operation on adjacent masks to filter the constant moving pixels. This causes larger objects to allow more noise around the object to pass through this filter. As the detection of more than half of the object is compared, when the size of the pixels is 2×2 or 3×3, a drop of detection rate is observed at greater than 1.6 pixels per frame in diagonal direction, and greater than 1.9 pixels per frame in horizontal and vertical directions. These behaviors are expected because only constant moving pixels are allowed to move one pixel distance in adjacent frames. Consequently, moving objects with speed greater than 1 pixel per frame in horizontal and vertical directions and $(2)^{(1/2)}$ pixels per frame in diagonal direction will not be fully detected.

Compared to smaller objects, larger objects generally have fewer full detections and more partial detections. This behavior is caused by the adaptive property of the background model. From the data collected, it is observed that a 4×4 object moving at 0.1 pixels per frame in vertical or horizontal direction or a 3×3 object moving at 0.1 pixels per frame in diagonal direction will have more partial detections than smaller objects. This means that the background will start to adapt the foreground object after about 40 frames. Another reason for larger objects having more partial detection is the way constant foreground pixels are determined. Since the constant foreground pixels are defined as pixels that move one pixel distance in any direction in adjacent frames, as the speed increases, the module may start to lose track of small objects while detecting large objects partially.

When the direction variable is compared, while diagonal and horizontal directions behave similarly, vertical direction has noticeably fewer detections of more than half of the object. One explanation is that in a runway sequence, many background objects are aligned vertically. Therefore, if an object moving vertically was between two vertically aligned objects (or edges), the detection rate is affected by the two vertically aligned objects. Even though the chosen threshold parameters work well for the synthetic test, fine-tuning is useful in real world sequences for some cases such as slow moving vehicles and low contrast sequences. Sometimes, in the real-world sequences, moving objects fade in and out. In the absence of a tracking feature, such objects can be detected when they appear.

Furthermore, the noise reduction method performs well for well-stabilized image sequences. However, stabilization near the end of a sequence may be affected if there are insufficient features to stabilize the runway, and the runway slides. In such scenarios, some background edges may be classified as foreground pixels. To account for this phenomenon, noise reduction method is applied to remove the edges.

Figure 12:
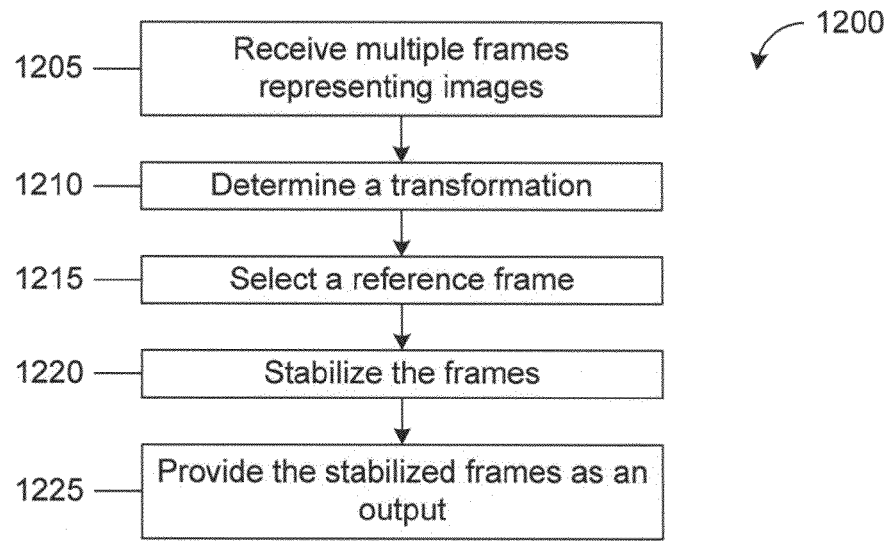
FIG. 12 is an example flowchart of a process for stabilizing multiple frames.

FIG. 12 is an example flowchart of a process 1200 for stabilizing multiple frames. The process 1200 receives multiple frames representing images (step 1205). The multiple frames represents images. Each image is captured at a separate location and includes at least portions of a planar surface. For example, the multiple frames can be captured by an infrared camera mounted on an airplane as the airplane approaches a runway. Because the airplane is continuously moving towards the runway, each of the multiple frames is captured at a separate location.

The process 1200 determines a transformation mapping a portion of the planar surface included in a first frame of the two consecutive frames to a corresponding portion of the planar surface included in a second frame of the two consecutive frames (step 1210). For example, for any two consecutive frames of the multiple frames, the process 1200 identifies positions of multiple feature points on the planar surface in one of the two consecutive frames as well as positions of corresponding feature points in the planar surface in the second of the two consecutive frames. The planar surface can be a four-sided polygon, for example, in scenarios where the planar surface is an airplane runway.

The process 1200 selects a reference frame from among multiple reference frames (step 1215). The multiple reference frames are included in the multiple frames. The process 1200 can periodically update the reference frame to a new reference frame. For example, the multiple frames can represent an image sequence. For consecutive frames that occur early in the image sequence, the first frame can be the reference frame. For consecutive frames that occur later in the image sequence, a subsequent frame can be the reference frame.

The process 1200 stabilizes the multiple frames (step 1220). For example, the process 1200 stabilizes the multiple frames by transforming the multiple frames to the selected reference frame. The transforming is based on the determined transformation. The process 1200 provides the stabilized frames as an output (step 1225). For example, the process 1200 provides the stabilized frames as an output to a system that performs motion detection using background modeling. The background modeling identifies an image in the reference frame. Subsequent to background modeling, images in a stabilized frame are compared with images in the reference frame. If all objects are stationary, then the positions of corresponding images in the two frames should be the same. If positions of the same object in the two frames is not the same, then the object is determined to be a moving object.

Figure 13:
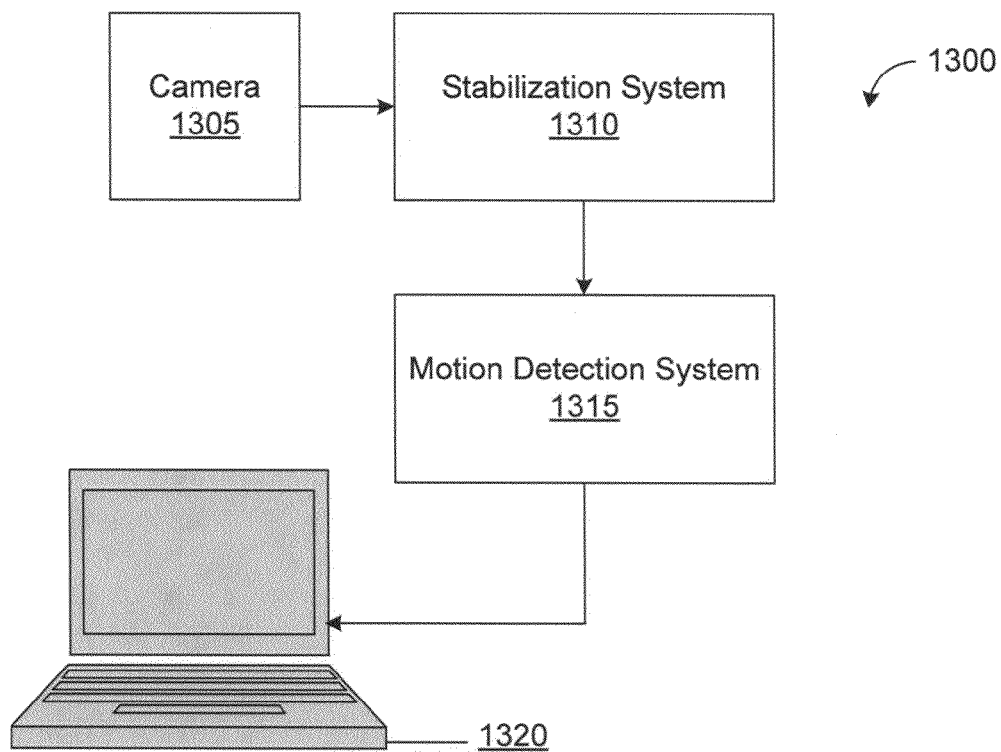
FIG. 13 is schematic of an example system for detecting moving objects on a planar surface.

FIG. 13 is schematic of an example system 1300 for detecting moving objects on a planar surface. The system 1300 includes a camera 1305, for example, an infrared camera to capture video that includes multiple frames. The captured video is received by a stabilization system 1310 that stabilizes the image sequence in which the multiple frames are captured with respect to reference frames. The system 1300 includes a motion detection system 1315 that receives the stabilized sequence from the stabilization system 1310 and detects moving objects. The output of motion detection can be provided to an output device 1320, for example, a computer system. The components of system 1300 can be implemented to perform the operations described previously, for example, with reference to FIG. 12.

Figure 14:
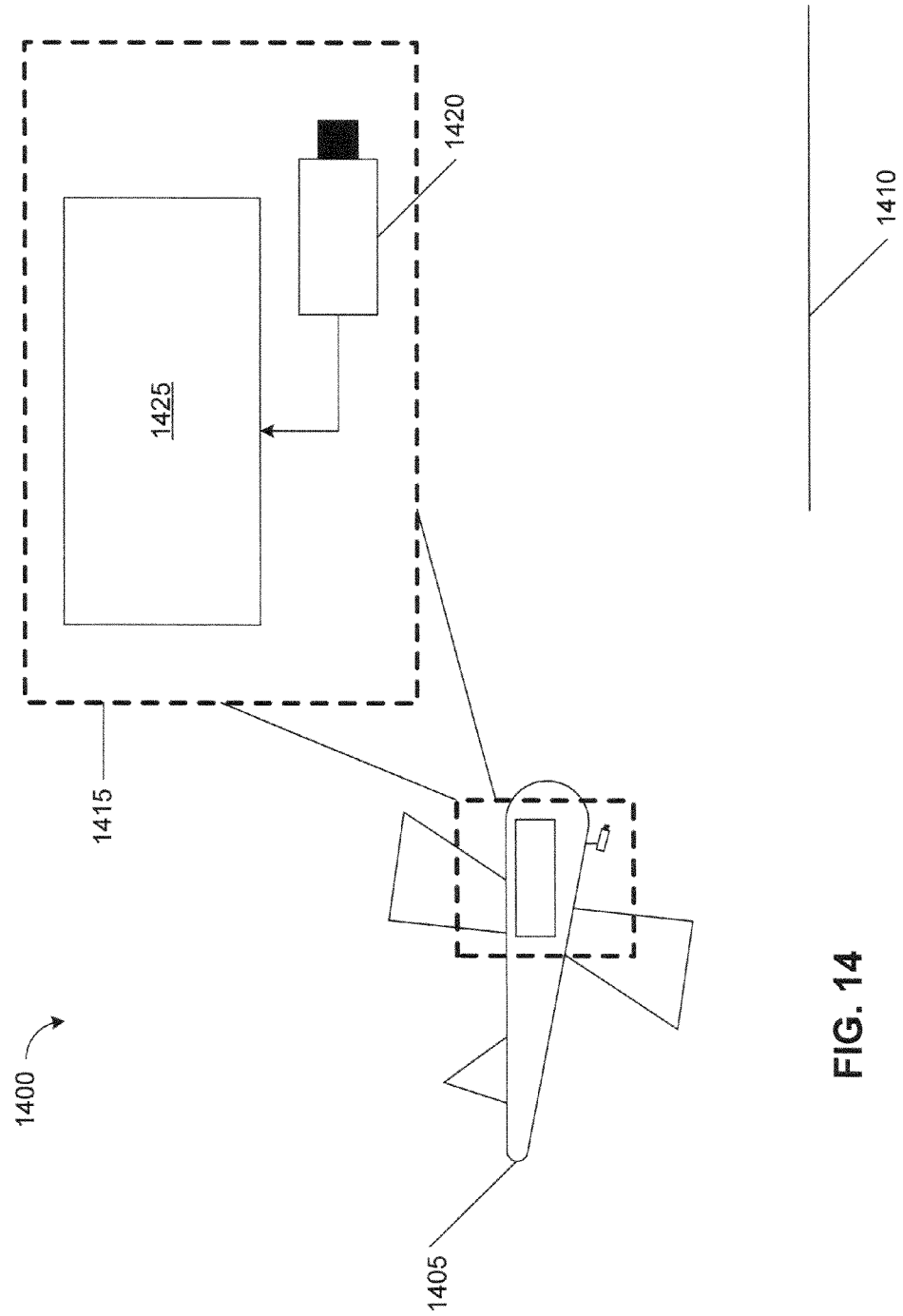
FIG. 14 is a schematic of an example system for capturing images of a runway from an airplane.

FIG. 14 is a schematic of an example system 1400 for capturing images of a runway from an airplane. The system includes an airplane 1405 approaching a runway 1410. The airplane 1405 includes a motion detection system 1415 mounted onboard. The motion detection system 1415 includes an infrared camera 1420 configured to continuously capture images of the runway 1410 as the airplane 1405 approaches. The motion detection system 1415 includes a stabilization system 1425 that receives the captured images and performs motion detection as described previously, for example, with reference to FIG. 12.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the specification or of what may be claimed, but rather as descriptions of features specific to particular implementations of the specification. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the specification have been described. Other implementations are within the scope of the following claims. For example, the actions recited in the claims can be performed in a different order and still achieve desirable results. In some implementations, the infrared camera can be positioned at a location on the ground, for example, on a swivel adjacent to a runway, and can continuously scan the runway as the airplane approaches. The stabilization and the motion detection systems can receive the images captured by the camera via wireless means, for example, over a wireless network. The stabilization and motion detection systems can be positioned onboard the airplane. Alternatively, these systems can be positioned on the ground, and the results of the motion detection can be communicated to the airplane.

What is claimed is:

1. A computer-implemented method comprising:
   receiving a plurality of frames representing images including at least portions of a planar surface, each image captured at a separate location;
   for any two consecutive frames in the plurality of frames, determining a transformation mapping a portion of the planar surface included in a first frame of the two consecutive frames to a corresponding portion of the planar surface included in a second frame of the two consecutive frames;
   updating from a first reference frame from the plurality of frames to a second reference frame from the plurality frames in accordance with a measure;

transforming the plurality of frames to the respective first and second reference frames based on the determined transformations to stabilize the plurality of frames; and providing the stabilized frames as an output;
wherein the measure comprises a ratio of an edge length for a frame from the plurality of frames before and after transformation to the first reference frame.

2. The method of claim 1, wherein the ratio comprises a ratio of an edge length of a portion of the planar surface.

3. The method of claim 1, wherein determining the transformation comprises identifying feature points in the two consecutive frames.

4. The method of claim 3, wherein the feature points are determined using Scale Invariant Feature Transform.

5. The method of claim 1, wherein the planar surface is a polygon.

6. The method of claim 5, wherein the polygon consists of four sides.

7. The method of claim 1, wherein the plurality of frames are captured by an infrared camera.

8. The method of claim 7, wherein the infrared camera is mounted on an airplane.

9. The method of claim 8, wherein the planar surface is a runway on which the airplane is to land.

10. The method of claim 1, further comprising:
performing motion detection using background modeling on the stabilized frames, wherein the background modeling identifies an image in the first reference frame;
identifying an image in a stabilized frame that corresponds to the image in the first reference frame by comparing images in the stabilized frame with images in the first reference frame; and
upon identifying that a position of the corresponding image in the stabilized frame is different from the image in the first reference frame, determining that the corresponding image represents a moving object.

11. A system comprising:
a data processing apparatus; and
a non-transitory medium configured and arranged to cause the data processing apparatus to perform operations comprising:
receiving a plurality of frames representing images including at least portions of a planar surface, each image captured at a separate location;
for any two consecutive frames in the plurality of frames, determining a transformation mapping a portion of the planar surface included in a first frame of the two consecutive frames to a corresponding portion of the planar surface included in a second frame of the two consecutive frames;
updating from a first reference frame from the plurality of frames to a second reference frame from the plurality frames in accordance with a measure;
transforming the plurality of frames to the respective first and second reference frames based on the determined transformations to stabilize the plurality of frames; and
providing the stabilized frames as an output;
wherein the measure comprises a ratio of an edge length for a frame from the plurality of frames before and after transformation to the first reference frame.

12. The system of claim 11, wherein the ratio comprises a ratio of an edge length of a portion of the planar surface.

13. The system of claim 11, wherein determining the transformation comprises identifying feature points in the two consecutive frames.

14. The system of claim 13, wherein the feature points are determined using Scale Invariant Feature Transform.

15. The system of claim 11, wherein the planar surface is a polygon.

16. The system of claim 15, wherein the polygon consists of four sides.

17. The system of claim 11, further comprising an infrared camera to capture the plurality of frames.

18. The system of claim 17, wherein the infrared camera is mounted on an airplane.

19. The system of claim 18, wherein the planar surface is a runway on which the airplane is to land.

20. The system of claim 11, the operations further comprising:
performing motion detection using background modeling on the stabilized frames, wherein the background modeling identifies an image in the first reference frame;
identifying an image in a stabilized frame that corresponds to the image in the first reference frame by comparing images in the stabilized frame with images in the first reference frame; and
upon identifying that a position of the corresponding image in the stabilized frame is different from the image in the first reference frame, determining that the corresponding image represents a moving object.

21. A computer-implemented method comprising:
receiving a plurality of frames, each frame including an image of at least a portion of a planar surface;
stabilizing two consecutive frames of the plurality of frames, the stabilizing comprising determining a transformation mapping a succeeding frame of the two consecutive frames to a preceding frame of the two consecutive frames and based on the transformation, warping the two consecutive frames to a reference frame of the plurality of frames; and
detecting a movement of an object in the two consecutive frames, the movement based on a change in positions of the object in the preceding frame and the successive frame;
wherein the detecting further comprises determining a transformation to compensate for a variation in intensity gain between the two consecutive frames; and
wherein the reference frame is updated based on a ratio of an edge length for frames before and after their respective warping.

22. The method of claim 21, further comprising capturing the plurality of frames using an infrared camera.

23. The method of claim 21, further comprising identifying the planar surface in at least one frame of the plurality of frames.

24. The method of claim 21, wherein the stabilizing further comprises determining a transformation mapping a frame in the plurality of frames to the reference frame.

25. The method of claim 21, wherein the detecting further comprises filtering the plurality of frames to retain only the at least a portion of the planar surface.

26. The method of claim 21, wherein the movement of the object in the two consecutive frames is detected using background modeling.

27. A computer-implemented method to detect moving objects on a runway from data captured by an infrared camera included in an aircraft approaching the runway, the method comprising:
receiving a sequence of images, each of the images including a representation of the runway captured by the infrared camera from a different location as the aircraft approaches the runway;
estimating, for each of at least two separate portions of the sequence of images, perspective transformations between a selected region in a reference image and in additional images of the portion of the sequence, the selected region in each image including the representation of the runway but not including all image data of the image;

updating the reference image from a first reference image to a second reference image responsive to an indication of a titling angle passing a threshold, wherein the first reference image is used for a first of the at least two separate portions of the sequence of images, the second reference image is used for a second of the at least two separate portions of the sequence of images, and the titling angle is associated with a current projective transformation estimated with respect to the first reference image;

creating a background model from the sequence of images; and identifying moving objects by comparing the sequence of images with the background model.

28. The computer-implemented method of claim 27, comprising identifying the selected region in each of the images of the sequence.

29. The computer-implemented method of claim 28, wherein identifying the selected region comprises using data from one or more devices on the aircraft, including a receiver for a satellite-based positioning system, to calculated locations of vertices for the selected region.

30. The computer-implemented method of claim 27, wherein the estimating comprises:
identifying feature points in the selected region for each of the images using Scale Invariant Feature Transform; and
calculating a projective transformation between two images using identified feature points matched between the two images.

31. The computer-implemented method of claim 27, comprising determining the indication of the titling angle by calculating a ratio of a lower edge length of an image before and after its projective transformation.

32. The computer-implemented method of claim 27, comprising normalizing each of the at least two separate portions of the sequence of images by correcting global intensity for each of the additional images with respect to the reference image in each respective portion of the sequence.

33. The computer-implemented method of claim 32, wherein creating the background model comprises updating the background model for the transition between the first portion and the second portion of the sequence of images, the background model updating comprising adjusting mean intensity of the background model against the second reference image.

* * * * *